United States Patent
Baumgartner

(10) Patent No.: US 6,862,785 B2
(45) Date of Patent: Mar. 8, 2005

(54) COUPLING DEVICE PARTICULARLY FOR VEHICLE WHEELS UNDERGOING SURFACE FINISHING

(75) Inventor: Heinrich Georg Baumgartner, Schiltach (DE)

(73) Assignee: BBS-Riva S.p.A., Frazione Ruina (IT)

( * ) Notice: Subject to any disclaimer, the term of this patent is extended or adjusted under 35 U.S.C. 154(b) by 0 days.

(21) Appl. No.: 10/343,696

(22) PCT Filed: Jun. 3, 2002

(86) PCT No.: PCT/EP02/06055
§ 371 (c)(1),
(2), (4) Date: Jan. 31, 2003

(87) PCT Pub. No.: WO02/098589
PCT Pub. Date: Dec. 12, 2002

(65) Prior Publication Data
US 2003/0143046 A1 Jul. 31, 2003

(30) Foreign Application Priority Data
Jun. 6, 2001 (IT) .................... PD2001A0135

(51) Int. Cl.⁷ .............................. B23B 1/00; B23B 5/34
(52) U.S. Cl. ................... 29/26 A; 29/563; 279/2.02; 279/2.03; 409/219
(58) Field of Search .................. 279/2.02, 2.03, 279/2.11, 2.12, 133, 137, 144, 51; 269/48.1; 29/563, 564, 26 A, 894; 409/219, 197; 157/14, 18

(56) References Cited

U.S. PATENT DOCUMENTS

| | | | |
|---|---|---|---|
| 2,192,888 A | | 3/1940 | Blazek et al. |
| 2,434,498 A | | 1/1948 | Klassett |
| 3,323,808 A | * | 6/1967 | Newhouser ............. 279/133 |
| 5,081,889 A | | 1/1992 | Oyobiki et al. |
| 5,464,233 A | | 11/1995 | Hanai |
| 5,503,508 A | | 4/1996 | Amiguet et al. |
| 5,562,007 A | | 10/1996 | Seymour |
| 5,680,801 A | * | 10/1997 | Keller ................. 279/137 |
| 5,820,137 A | * | 10/1998 | Patterson .............. 279/133 |
| 6,126,174 A | * | 10/2000 | Reece et al. ............ 29/802 |

FOREIGN PATENT DOCUMENTS

EP    A-0 539 837    5/1993

OTHER PUBLICATIONS

Patent Abstracts of Japan vol. 012, No. 160 (M–697), May 14, 1988 –& JP62279041 A (Topy IND LTD), Dec. 3, 1987 abstract; figure 1.

Patent Abstracts of Japan vol. 1997, No. 07, Jul. 31, 1997 –& JP 09 066410 A (HOWA Mach LTD) Mar. 11, 1997 abstract; figures.

Patent Abstracts of Japan vol. 008, No. 136 (M–304) Jun. 23, 1984 –& JP 59 037002 A (Toshiba Kikai KK), Feb. 29, 1984 abstract; figure 2.

* cited by examiner

Primary Examiner—A. L. Wellington
Assistant Examiner—Dana Ross
(74) Attorney, Agent, or Firm—Greer, Burns & Crain, Ltd.

(57) ABSTRACT

A coupling device, particularly for vehicle wheels undergoing surface finishing, comprising elements for the releasable fixing of a wheel to a chuck, which act in holes for the passage of screws for fixing the wheel to a hub of a vehicle.

23 Claims, 4 Drawing Sheets

COUPLING DEVICE PARTICULARLY FOR VEHICLE WHEELS UNDERGOING SURFACE FINISHING

BACKGROUND OF THE INVENTION

The present invention relates to a coupling device particularly for vehicle wheels undergoing surface finishing.

Surface finishing of vehicle wheels, for example alloy wheels, is currently rather complicated and consists of several operating steps.

The operator picks up the wheel blank, which arrives from casting or forging, from a pallet arranged to the side of a lathe, and places it on the first coupling fixture with the design facing downward, locking it with a pedal-operated pneumatic device.

The operator gives the clearance signal to the lathe and the first turning cycle begins.

Once the first turning cycle has been completed, the operator picks up the semi-finished wheel and places it in the second coupling fixture with the design facing upward, locking it with the same pneumatic pedal.

The operator gives the clearance signal to the lathe and the second turning cycle begins in order to finish the wheel.

Once the second cycle has ended, the operator picks up the fully turned wheel and, after cleaning it of the chips by means of a compressed-air gun, places it on the coupling fixture of a drilling machine arranged in front of the lathe.

The operator locks the wheel by means of a pneumatic system and gives the drilling machine the clearance signal to start the cycle, i.e., to drill the holes for fixing the wheel to the hub.

Once the first drilling step has ended, the operator picks up the wheel, cleans it of the chips and places it in the semi-finished wheel parking roller conveyor.

At the end of the roller conveyor, the semi-finished wheel is picked up and locked on a pneumatic fixture of a valve hole drilling machine, which performs the drilling and counter-boring operation.

After the drilling operation, the wheel is placed on a table for deburring the fixing holes and the valve hole, and deburring is performed by means of appropriate tools at the wheel cutout edges.

After deburring, the wheel is subjected to brushing and then, after also eliminating the casting defects that are present in the design, the wheel is arranged on the washing roller conveyor.

It is thus evident that the surface finishing of a wheel consists of several operating steps on different machines and with different fixing operations, entailing considerable problems, including the possibility of incorrect machining due to errors in flatness, eccentricity and degree of tolerance.

Moreover, the operation is particularly time-consuming as far as the duration of the turning cycle and of wheel handling are concerned.

SUMMARY OF THE INVENTION

The aim of the present invention is to solve or substantially reduce the problems related to the surface finishing of vehicle wheels.

Within this aim, an object of the invention is to provide a coupling device for vehicle wheels undergoing surface finishing by way of which it is possible to provide a single turning cycle.

Another object is to provide a coupling device that allows to reduce the duration of the turning cycle.

Another object is to provide a coupling device that is flexible in terms of wheel type to be machined.

Another object is to provide an apparatus using a coupling device that allows to reduce wheel handling times and allows fully automatic handling of the wheel.

Another object is to provide a coupling device and an apparatus using the device that can be manufactured with known systems and technologies.

This aim and these and other objects that will become better apparent hereinafter are achieved by a coupling device, particularly for vehicle wheels undergoing surface finishing, characterized in that it comprises means for the reversible fixing of the wheel to a chuck, which act in holes for the passage of screws for fixing the wheel to a hub of a vehicle.

BRIEF DESCRIPTION OF THE DRAWINGS

Further characteristics and advantages of the present invention will become better apparent from the description of a preferred but not exclusive embodiment thereof, illustrated by way of non-limitative example in the accompanying drawings, wherein.

DESCRIPTION OF THE PREFERRED EMBODIMENTS

Figure 1:
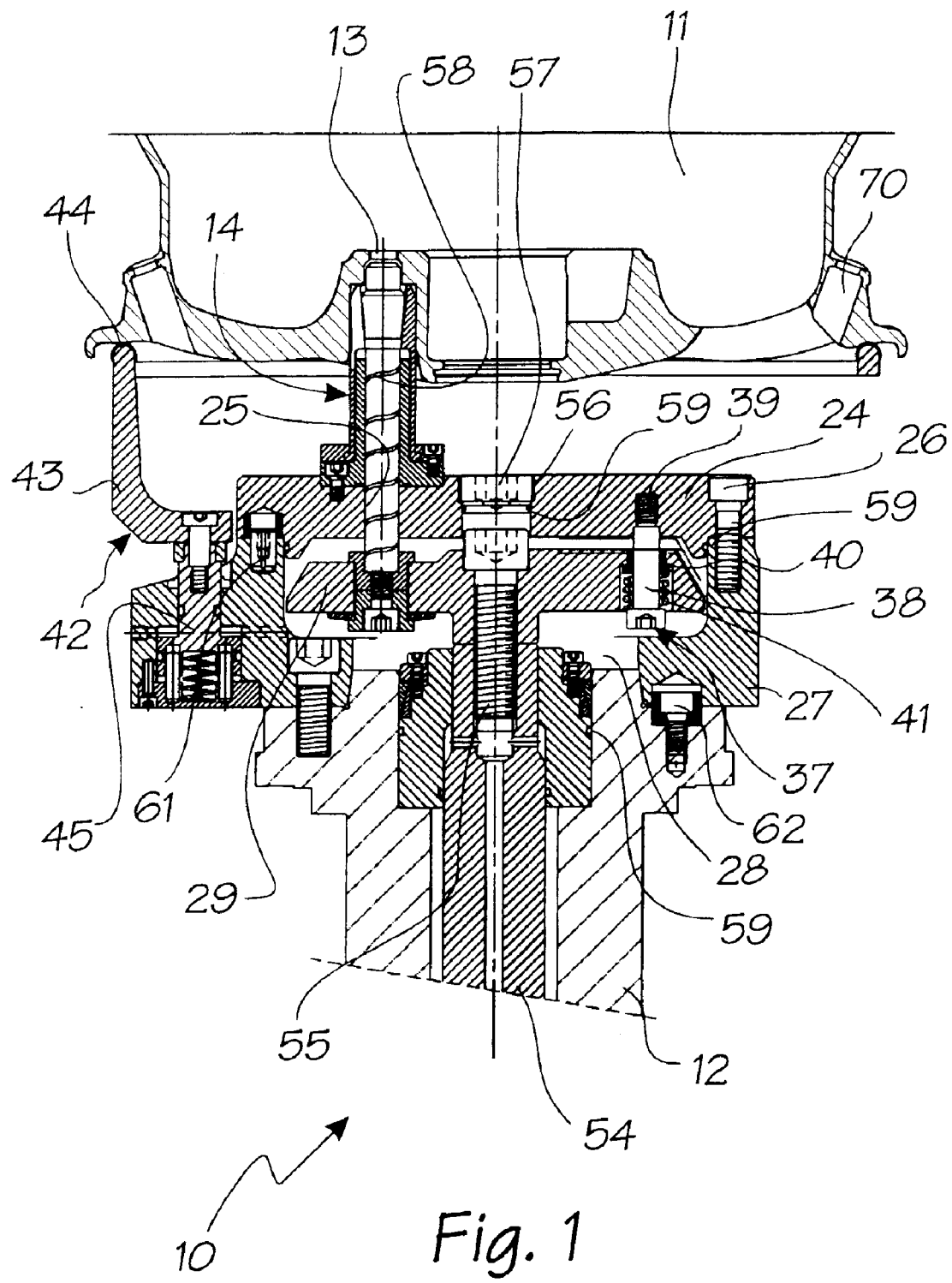
FIG. 1 is a transverse sectional view of a coupling device particularly for vehicle wheels undergoing surface finishing, according to the invention.
Figure 2:
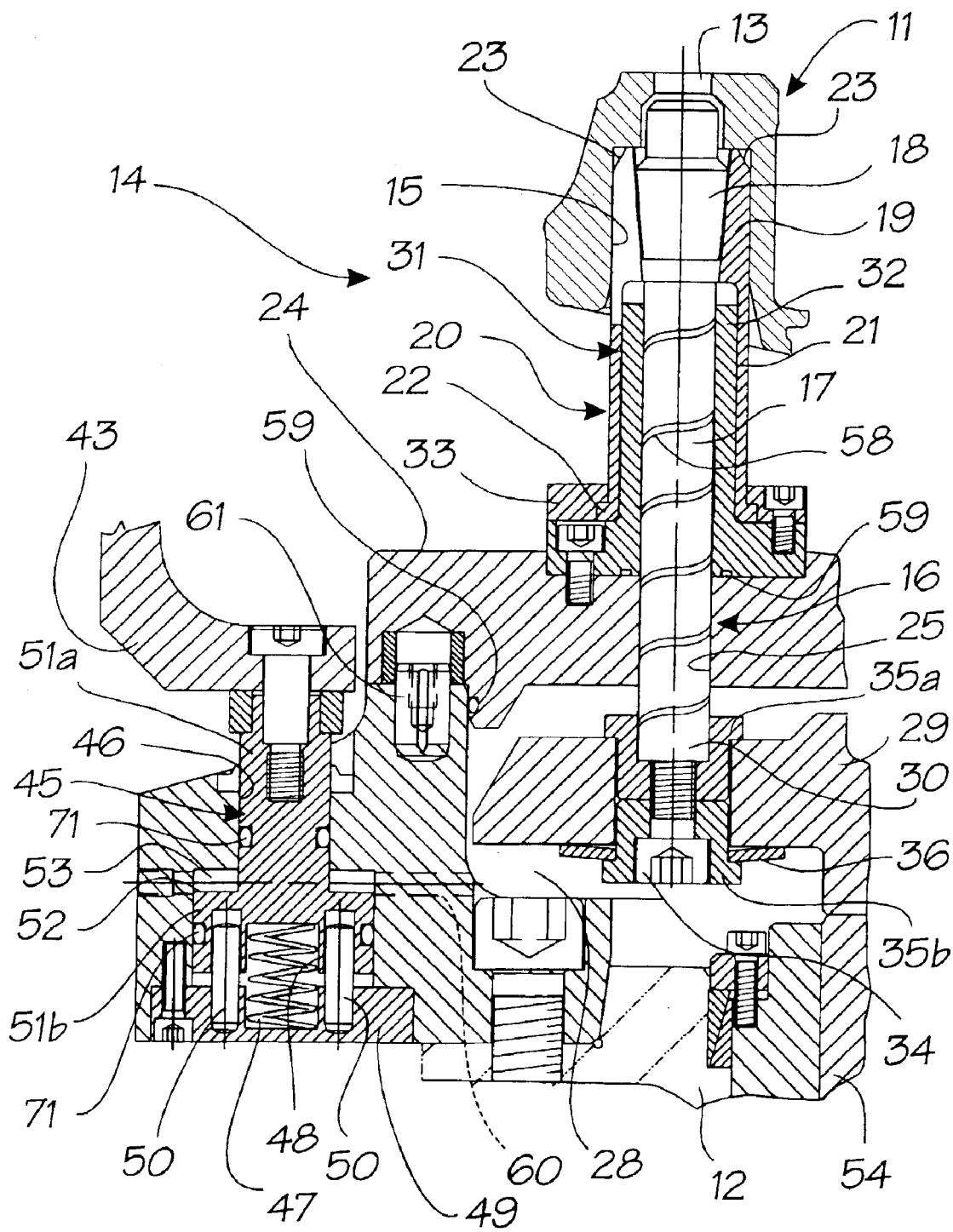
FIG. 2 is a view of a detail of the device of FIG. 1.
Figure 3:
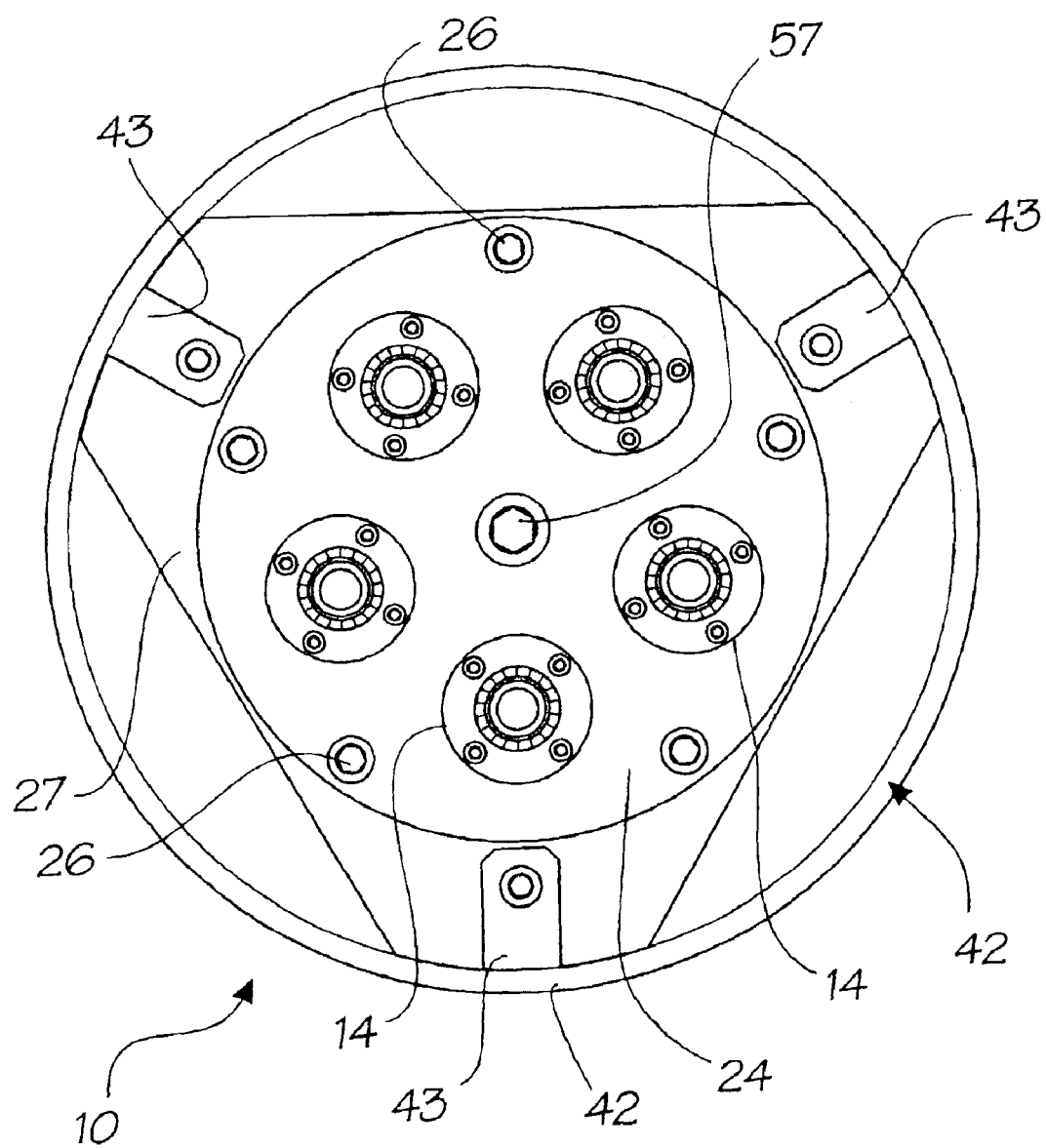
FIG. 3 is a plan view of the device.
Figure 4:
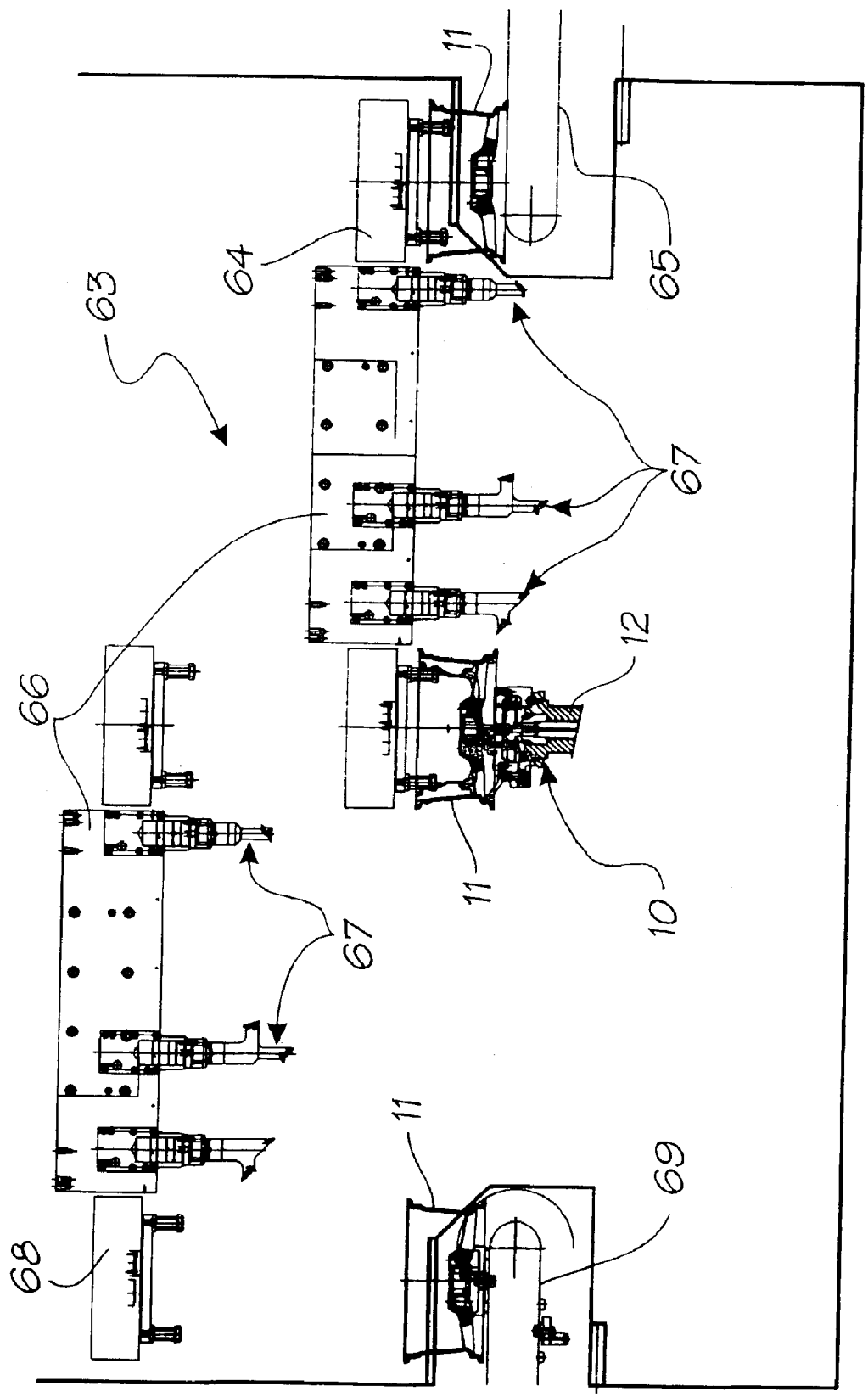
FIG. 4 is a schematic view of an apparatus particularly for the surface finishing of vehicle wheels, which comprises a device according to the invention.

With reference to the figures, a coupling device particularly for vehicle wheels undergoing surface finishing, according to the invention, is generally designated by the reference numeral 10.

The device 10 comprises reversible means, described in greater detail hereinafter, for fixing a wheel 11 to a chuck 12 at passage holes 13 of screws for fixing the wheel 11 to a hub of a motor vehicle.

The fixing means are constituted by a plurality, depending on the number of passage holes 13, of expansion means, generally designated by the reference numeral 14, which are associated with corresponding actuation means, described in greater detail hereinafter, and fixed to the chuck 12.

The expansion means 14 engage a cylindrical surface 15 of the passage holes 13.

Each expansion means 14 comprises a traction element 16, with a cylindrical body 17 and a head 18 coupled with a taper fit to an upper portion 19 of an expander 20.

The expander 20 has a tubular body 21 with a flanged base 22 and a head portion 19 that has a conical internal shape, and extends from the base 22 to the head 19, which is provided with axially arranged radial slits suitable to form flexible laminas 23.

The expander 20 is fixed to an upper flange 24 provided with passage holes 25 for the traction elements 16.

The upper flange 24 is fixed, at its perimetric portion, by means of screws 26, to a substantially annular contoured central body 27, which is in turn fixed to the chuck 12.

A first interspace 28 is defined between the central body 27 and the upper flange 24, and an inner flange 29 is arranged therein; the inner flange is associated with corresponding axial movement means, described in greater detail hereinafter, and the traction elements 16 are fixed to the inner flange at their base 30.

The expander 20 is fixed to the upper flange 24 by means of a tubular element 31 that is flanged in a downward region and is fixed by means of screws to the upper flange 24.

The tubular element 31 has a body 32 that is inserted within the expander 20, which is fixed thereto by means of a ring 33, which is in turn fixed by means of screws to the flange of the tubular element 31, acting on the flanged base of the expander 20.

The traction element 16 has a cylindrical body 17 that can slide, with limited play, within the tubular element 31 and a head 18 that is shaped complementarily to the inner surface of the head portion 19 of the expander 20.

A fixing screw 34 is engaged below the cylindrical body 17, with interposed mutually opposite bushes 35a and 35b, which are associated with play with the inner flange 29.

Advantageously, between the lower bush 35b and the inner flange 29 a Belleville spring washer 36 is provided.

The inner flange 29 is associated with the upper flange 24 by means of axial guides, which are constituted by multiple guiding screws 37 which also prevent the relative rotation of the two flanges and are staggered circumferentially with respect to the expansion means 14, with a body 38 that is threaded in a downward region, engages in a corresponding complementarily threaded hole 39 provided in the upper flange 24, and is able to slide within a guiding bush 40 that is fixed to the inner flange 29.

A helical spring 41 is arranged so as to be compressed between the guiding bush 40 and the head of the screw 37.

The device 10 comprises a vibration-damping ring, generally designated by the reference numeral 42, which normally rests on the front surface of the wheel 11 by way of elastic means described in greater detail hereinafter.

The vibration-damping ring 42 is provided, in a downward region, with brackets 43 which lie on the opposite side with respect to the portion that faces the wheel 11 and are fixed at the head of plungers 45 that can slide axially within corresponding and complementarily shaped seats 46 provided perimetrically, in an axial direction, on the central body 27 and are associated with said elastic pusher means.

The elastic pusher means are constituted by helical springs 47, which are arranged at axial slots 48 provided on the base of the plungers 45 and are compressed between said slots 48 and a cover 49 that is fixed to the central body 27, below each plunger.

The cover 49 is further provided with a rigidly associated pair of pins 50, which are arranged in an axial direction, can slide within corresponding seats provided in the plungers 45, and are designed to act as an axial guide and to prevent the rotation thereof.

Each plunger 45 has a body that comprises two portions 51a and 51b, which have different diameters and are suitable to define a shoulder 52.

The seats 46 are shaped complementarily to the body of the plunger 45, so as to form a second interspace 53 into which compressed air is fed; the air is suitable to produce, on the plunger 45, a thrust that is opposite to the thrust applied by the helical springs 47.

The vibration-damping ring 42 is provided, on the portion that faces the wheel 11, with an oilproof cladding 44 made of vulcanized rubber.

As mentioned, the inner flange 29 is associated with means for moving it axially, which are constituted by a hydraulically actuated shaft 54 that can slide axially within the chuck 12 and to which the inner flange 29 is fixed at the end by means of an axial grub screw 55.

The upper flange 24 has a central hole 56 with a plug 57 in order to allow the user to access the grub screw 55.

The traction element 16 has a cylindrical body 17 provided with a helical surface groove 58 that connects the first interspace 28 with the outside.

The first interspace 28 is isolated pneumatically by means of a plurality of gaskets designated by the reference numeral 59; in this manner, by injecting compressed air into the first interspace 28 it is possible to make the air flow along the groove 58, consequently cleaning the corresponding expander 14 of machining waste chips.

The first interspace 28 is connected to the second interspace 53, which is also isolated pneumatically by means of corresponding gaskets 71, by way of radial ducts 60 formed in the central body 27.

The device 10 further comprises first abutment elements 61 for the angular positioning of the upper flange 24 on the central body 27 and second abutment elements 62 for the angular positioning of the central body 27 on the chuck 12.

The device 10 is arranged so that its axis is vertical in a turning center, generally designated by the reference numeral 63, of an apparatus for the surface finishing of vehicle wheels, not shown for the sake of simplicity.

The apparatus comprises, arranged in operating sequence, a drilling center, described in greater detail hereinafter, and the turning center 63.

The drilling center allows to provide the valve holes 70 and the fixing holes 13 on the semi-finished wheel.

The turning center 63 instead comprises a first handling unit 64, which picks up the wheel 11 that arrives from the drilling center from a first conveyor 65 in order to load it onto the coupling device 10.

A plate 66, which can move on a vertical working plane, supports a plurality of tools, generally designated by the reference numeral 67, required for the surface machining of the wheel 11.

At the end of the machining operation, a second handling unit 68 is arranged so as to pick up the fully machined wheel 11 from the coupling device 10 and arrange it on a second conveyor 69.

As regards the operation of the apparatus for the surface finishing of vehicle wheels, the semi-finished wheel is taken from a pallet arranged laterally to the drilling center and is placed on the centering template in step or timing, locking it at the center by means of a pneumatic apparatus arranged on an oscillating table that is fixed on the surface of the drilling machine.

After fixing the wheel, the drilling cycle begins, forming the wheel fixing holes.

Once the fixing holes have been machined, the oscillating surface is moved, allowing to tilt the wheel and therefore form the valve hole on the front side, and allowing to perform counter-boring after a rotation through 180 degrees.

After this operation, the wheel is cleaned of the chips by means of a compressed-air gun and is positioned on the first conveyor 65 of the turning center.

By means of the first handling unit 64, the wheel is picked up automatically and arranged on the fixing device 10.

By way of the particular arrangement of the wheel on the centering device and of the arrangement of the tools 67, the wheel is subjected to the entire turning cycle without further repositioning.

Once the turning cycle has been completed, a second handling unit 68 picks up the fully machined wheel from the device 10 to arrange it at the second unloading conveyor 69.

The wheel is then arranged on a finished wheel parking roller conveyor, from which it is taken by an operator, who deburrs the fixing holes and the valve hole with appropriate tools and removes the sharp edge under the spokes with a brushing unit.

As regards the coupling device 10, operation is as follows.

When the device is not performing coupling, the inner flange 29 is actuated by the shaft 54 so that it advances toward the upper flange 24, concordantly with the action of the helical springs 41, so that the conical head 18 of the traction element 16 does not engage the head portion 19 of the expander 20.

At the same time, the vibration-damping ring 42, by way of the pneumatic thrust generated in the second interspaces 53 on the plungers 45, performs a translational motion away from the inner flange 29, toward the chuck 12.

At this point, the first handling unit 64 arranges a wheel 11 so that the upper portions of the expansion means 14 are inserted in the passage holes 13.

The shaft 54 retracts, actuating the descent of the inner flange 29 and therefore of the traction elements 16, which act by means of the head 18 on the expander elements 20, whose upper portions 19 grip the cylindrical inner surface of the passage holes 13.

At the same time, the pneumatic thrust on the plungers 45 is stopped; as a consequence of the thrust of the helical springs 47, the plungers 45 rest the vibration-damping ring 42 on the front face of the wheel 11.

At the end of the turning process, the traction elements 16 are actuated again to disengage with respect to the expanders 20, allowing the second handling unit 68 to pick up the fully machined wheel 11.

At the same time, the pneumatic thrust actuates the descent of the vibration-damping ring 42 and the flow of compressed air from the first interspace 28 into the helical grooves 58 provided superficially on the traction elements 16 in order to allow to clean the expander means 14 of any machining waste, such as chips.

In practice it has been observed that the present invention has achieved the intended aim and objects.

A device has in fact been provided that allows a single coupling of the wheel for its complete surface machining.

The wheel is therefore turned in a single cycle, consequently reducing the handling times and the time required for the turning cycle itself.

It is also evident that an apparatus that uses a coupling device according to the invention allows fully automated handling of the wheel.

The device according to the invention therefore allows overall improvement of the quality of the wheel, particularly as to flatness, eccentricity and degree of tolerance.

The present invention is susceptible of numerous modifications and variations, all of which are within the scope of the appended claims.

The technical details may be replaced with other technically equivalent elements.

The materials, so long as they are compatible with the contingent use, as well as the dimensions, may be any according to requirements.

What is claimed is:

1. A coupling device, particularly for vehicle wheels undergoing surface finishing, comprising means for a reversible fixing of the wheel to a chuck, which act in holes for the passage of screws for fixing the wheel to a hub of a vehicle, wherein said fixing means are constituted by a plurality of expansion means, each of which engages a cylindrical surface of said passage holes, said expansion means being associated with actuation means and being fixed to said chuck.

2. The device according to claim 1, wherein each one of said expansion means comprises a traction element in which a head is coupled with a taper fit to the upper portion of an expander, said expander being fixed to an upper flange provided with passage holes for said traction elements, said upper flange being fixed at its perimetric portion to a contoured central body that is substantially annular and is in turn fixed to said chuck, a first interspace being formed between said central body and said upper flange, an inner flange being arranged in said interspace and being associated with means for its axial movement, said traction elements being fixed to said inner flange at a base of said traction elements.

3. The device according to claim 2, wherein said expander has a tubular body, with a flanged base and an internally conical contoured head portion that widens from the base toward the head of the tubular body and is provided with axially arranged radial slits so as to form flexible laminas.

4. The device according to claim 3, wherein said expander is fixed to said upper flange by means of a tubular element that has a flange in a downward region and is fixed by means of screws to said upper flange, said tubular element having a body that is inserted within said expander and is rigidly coupled thereto by means of a ring that is fixed, by means of screws, to the flange of said tubular element and acts on the flanged base of said expander.

5. The device according to claim 4, wherein said traction element has a cylindrical body that can slide with limited play within said tubular element and a head that is shaped complementarily to the inner surface of the head portion of said expander, a screw engaging below said cylindrical body in order to fix said body to said inner flange, a pair of mutually opposite bushes associated with said flange with play being interposed between said cylindrical body and said fixing screw.

6. The device according to claim 5, wherein a Belleville spring washer is arranged between a the lower bush of said opposite bushes and said inner flange.

7. The device according to claim 2, wherein said inner flange is associated with said upper flange by means of axial guides constituted by a plurality of screws staggered circumferentially with respect to said expansion means, each screw having a body that is threaded in a downward region, engages on a corresponding complementarily threaded hole formed in said upper flange, and is able to slide within a guiding bush that is fixed to said inner flange, helical springs being arranged, in a compressed condition, between said guiding bush and the head of said screw.

8. The device according to claim 2, wherein said means for moving said inner flange axially are constituted by an hydraulically actuated shaft that can slide axially within said chuck, said inner flange being fixed at an end thereof on said shaft by means of an axial grub screw.

9. The device according to claim 8, wherein said upper flange is provided with a central hole which has a plug for access to said grub screw for fixing said inner flange to the shaft.

10. The device according to claim 2, wherein said traction element has a body that is provided with a helical surface groove that is suitable to connect said first interspace to the outside.

11. The device according to claim 10, wherein said first interspace is pneumatically isolated by means of a plurality of gaskets, compressed air being introduced in said first interspace and being suitable to flow within said groove.

12. The device according to claim 11, wherein said first interspace is connected to said second interspaces by way of radial ducts formed in said central body.

13. The device according to claim 2, comprising first abutment elements for angular positioning of said upper flange on said central body.

14. The device according to claim 2, further comprising second abutment elements for angular positioning of said central body on said chuck.

15. A method for surface finishing of vehicle wheels using a device according to claim 1, comprising the steps of:

arranging a semi-finished wheel at a drilling center;

producing wheel fixing holes;

producing a valve hole;

picking up the wheel and arranging the wheel at said coupling device;

fixing the wheel at said device;

performing surface finishing.

16. The device according to claim 1, comprising a vibration-damping ring that normally rests on a front surface of the wheel.

17. The device according to claim 16, wherein said ring is associated with elastic means for pushing said ring against said front surface of the wheel.

18. The device according to claim 17, wherein brackets protrude from said vibration-damping ring on an opposite side with respect to the portion that faces said wheel, said brackets being fixed to the head of plungers that can slide axially in corresponding complementarily shaped seats provided perimetrically in said central body and are associated with said elastic pusher means.

19. The device according to claim 18, wherein said elastic pusher means are constituted by helical springs, which are arranged at axial slots provided on the base of said plungers and are compressed between said slot and said cover that is fixed in a downward region to said central body, each cover being provided with a rigidly coupled pair of pins that can slide within corresponding seats of the plunger in order to prevent the rotation thereof.

20. The device according to claim 19, wherein the body of each of said plungers comprises two portions with different diameters, which are suitable to form a shoulder that in turn generates, with the complementarily shaped sliding seat, a second interspace into which compressed air is fed, said air being suitable to generate, on the plunger, a thrust that is opposite to the thrust applied by said helical springs.

21. The device according to claim 16, wherein said vibration-damping ring is provided with an oilproof vulcanized rubber cladding on the portion that rests on said front surface of the wheel.

22. An apparatus particularly for the surface finishing of vehicle wheels, comprising a coupling device according to claim 1, the apparatus further comprising, in operating sequence, a drilling center, for forming valve holes and fixing holes, and a turning center, comprising a first handling unit for taking the wheel from a first conveyor and loading it onto said coupling device, a elate that can move on a vertical working plane, for supporting the tools required for surface machining, and a second handling unit for taking the finished wheel from said coupling device and for loading it into a second conveyor.

23. The apparatus according to claim 22, wherein said coupling device is arranged so that it has a vertical axis.

* * * * *

UNITED STATES PATENT AND TRADEMARK OFFICE
CERTIFICATE OF CORRECTION

PATENT NO.     : 6,862,785 B2
DATED          : March 8, 2005
INVENTOR(S)    : Baumgartner It is certified that error appears in the above-identified patent and that said Letters Patent is hereby corrected as shown below:

Column 6,
Line 43, delete "the".

Column 8,
Line 28, delete "elate" and insert -- plate --.

Signed and Sealed this

Nineteenth Day of July, 2005

JON W. DUDAS
*Director of the United States Patent and Trademark Office*